United States Patent [19]

Lee et al.

[11] Patent Number: 4,535,099

[45] Date of Patent: Aug. 13, 1985

[54] POLYIMIDE FOAM FROM MIXTURE OF SILICON CONTAINING DIAMINE AND DIFFERENT AROMATIC DIAMINE

[75] Inventors: Raymond Lee, Elk Grove Village; David W. Okey, Downers Grove; Gregory A. Ferro, Mt. Prospect, all of Ill.

[73] Assignee: IMI-Tech Corporation, Elk Grove Village, Ill.

[21] Appl. No.: 596,304

[22] Filed: Apr. 3, 1984

[51] Int. Cl.$^3$ ............................................. C08J 9/02
[52] U.S. Cl. ...................................... 521/154; 521/180; 521/189; 528/26; 528/353
[58] Field of Search ................... 528/26, 353; 521/154, 521/180, 189

[56] References Cited

U.S. PATENT DOCUMENTS

| | | | |
|---|---|---|---|
| 3,492,270 | 1/1970 | Parish | 528/26 |
| 3,553,282 | 1/1971 | Holub | 521/154 |
| 3,740,305 | 6/1973 | Hoback et al. | 528/26 |
| 3,812,069 | 5/1974 | Boldebuck | 528/26 |
| 4,030,948 | 6/1977 | Berger | 528/26 |
| 4,051,163 | 9/1977 | Berger | 528/26 |

FOREIGN PATENT DOCUMENTS

| | | | |
|---|---|---|---|
| 7407605 | 12/1974 | Netherlands | 528/26 |
| 2101149 | 1/1983 | United Kingdom | 528/26 |

*Primary Examiner*—Lester L. Lee
*Attorney, Agent, or Firm*—McDougall, Hersh & Scott

[57] ABSTRACT

A polyimide and a process for its preparation wherein the polyimide is prepared from reaction of an organic tetracarboxylic acid or derivative thereof with a mixture of an aromatic diamine and an amine-terminated silicone. The polyimides of the invention are particularly useful in the preparation of flexible foams.

8 Claims, No Drawings

POLYIMIDE FOAM FROM MIXTURE OF SILICON CONTAINING DIAMINE AND DIFFERENT AROMATIC DIAMINE

This invention relates to new polyimides and more particularly to closed cell polyimide foams which are hydrolytically stable and possess a majority of cells which are closed resulting in improved vapor barrier properties.

It is known, as is described in U.S. Pat. Nos. 3,966,652 and 4,315,076, that polyimides can be produced which are hydrolytically stable and which have improved fire resistance properties, giving off essentially no smoke or toxic fumes when exposed to flame.

Foams of the type there described are useful in aircraft cabins, space vehicles, land and sea transport equipment, as well as other applications where relatively non-flammable and negligible smoke-emitting characteristics are desirable.

In the practice of the prior art as described above, such polyimide foams are prepared by reacting an alkyl diester of a tetracarboxylic acid with one or more aromatic and/or heterocyclic diamines. Typically, a tetracarboxylic dianhydride is reacted with methanol or ethanol to form the corresponding diester which is then reacted with the amine or amines to form the corresponding polyamide-acid/ester which can then be converted to a polyimide by further heating. As a general rule, a cellular structure is developed, because both water and a lower alkyl alcohol corresponding to the alcohol portion of the ester is generated in situ during the reaction. These volatile materials produce open cell polyimide foams which are flexible and resistent and have fine, homogeneous cellular structure.

While amines of the type described above represent a a significant advance in the art, their properties when used in insulation in applications involving high humidity are not as great as might be desired. Specifically, foams produced in accordance with the foregoing concepts posses an open cellular structure and therefore do not have significantly high vapor-barrier qualities to facilitate their use in, for example, fire-resistant, antisweat submarine hull insulation.

It is known, as described by St. Clair et al. in the *Int. J. Adhesion and Adhesives*, 249–50 (July, 1981) that adhesives can be prepared by reaction of tetracarboxylic acid dianhydrides with amine-terminated silicone compounds to produce adhesives. However, the use of such amine-terminated silicones provides polyimides having adhesive qualities, which are not capable of being formed into flexible, resilient closed cell foams.

It is accordingly an object of the present invention to provide polyimides which are capable of being foamed and which can be used in applications in high humidity to provide vapor-barrier qualities.

It is a more specific object of the invention to provide a polyimide foam and a process for the preparation of the same to produce polyimide foams having fine homogeneous closed cellular structure which are flexible, resilient, and which can provide significantly improved vapor-barrier characteristics.

The concepts of the present invention reside in a polyimide foam and a process for its preparation in which the polyimide is prepared by reaction of an organic tetracarboxylic acid or corresponding anhydride or ester derivative thereof with a combination of diamines including at least one organic aromatic diamine and an aromatic amine-terminated silicone. It has been found that the combination of diamines described provides foams which have a good closed cellular structure, which are flexible and resilient even at low temperatures and which provide high vapor-barrier characteristics.

As the aromatic amine-terminated silicone, use is preferably made of a silicone having the general formula:

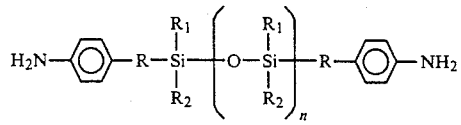

wherein R is a $C_2$ to $C_6$ alkylene group, $R_1$ and $R_2$ are each independently lower alkyl containing 1 to 3 carbon atoms and n is an integer from 1 to a 4. Such amine-terminated silicones are themselves well known to those skilled in the art and are commercially available.

As the organic aromatic diamine, use is preferably made of one or more aromatic and/or heterocyclic diamines which are themselves known to the art. Such aromatic diamines can be represented by the structure:

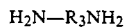

wherein $R_3$ is an aromatic group containing 5 to 16 carbon atoms and containing up to one hetero atom in the ring, the hetero atom being selected from the group consisting of —N—, —O— and —S—. Also included herein are those $R_3$ groups wherein R is a diphenylene group or a diphenylmethane group. Representative of such diamines are:

2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene It is sometimes preferred to use two of the foregoing amines, one amine being a carbocyclic aromatic diamine and the second amine used in combination with it being one of the foregoing aminopyridines.

In the preferred practice of the invention, the organic tetracarboxylic acid in the form of its diester from methanol or ethanol is reacted with the combination of diamines to form a polyamide-acid/ester prepolymer which can then be foamed and cured, either alone or in the presence of a blowing agent, to provide the desired polyimide foam.

The tetracarboxylic acids or derivatives thereof preferably employed in the practice of the invention are those having the general formula:

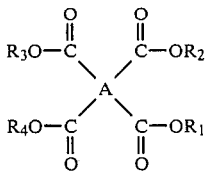

wherein A is a tetravalenat organic group and $R_1$ to $R_4$, inclusive, are each selected from the group consisting of hydrogen and lower alkyl, and preferably methyl, ethyl or propyl. The tetravalent organic group A is preferably one having one of the following structures:

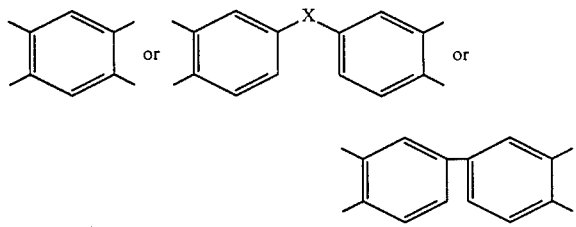

wherein X is one or more of the following:

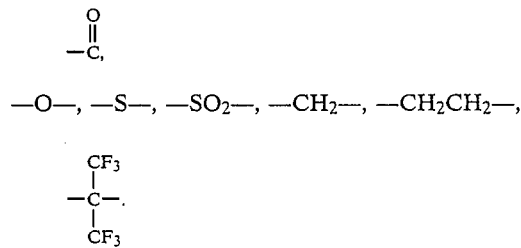

$-O-$, $-S-$, $-SO_2-$, $-CH_2-$, $-CH_2CH_2-$, $$-\underset{\underset{CF_3}{|}}{\overset{\overset{CF_3}{|}}{C}}-.$$

Preferred among the tetracarboxylic acid and derivataives thereof is 3,3', 4,4'--benzophenone tetracarboxylic acid and its corresponding lower alkyl (preferably lower dialkyl) esters.

It is also possible, and sometimes desirable in the preparation of the polyamide-acid/ester prepolymer, to include in the reaction mixture one or more aliphatic diamines. Such aliphatic diamines are preferably alpha-omega diaminoalkanes having the general formula:

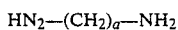

wherein a is an integer from 2 to 16. Representative of such diamines include 1,3-diaminopropane, 1,4-diaminobutane, 1,5-diaminopentane, 1,6-diaminohexane, etc.

In place of the foregoing aliphatic amines, use can also be made of the polyamines marketed by Texaco Chemical Company under the trademark JEFFAMINE. Those amines can be described as polyoxypropylene amines, and have the formula:

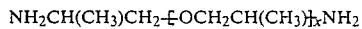

wherein x varies from 1 to 5.

In accordance with one preferred embodiment of the invention, the polyamide-acid/ester prepolymer is formed by reaction of a dialkyl ester of the organic tetracarboxylic acid with the amines described above. The relative proportions used in the preparation of the prepolymer can be varied to relatively wide limits to provide good foams. In general, it is preferred to employ between 0.5 to 1.5 total moles of amine per mole of the tetracarboxylic acid dianhydride or ester derivative thereof. The aromatic amine generally constitutes, when used, between 10 and 99.9 mole % of the total amount of the amines used. The molar concentration of the amino-terminated silicone generally ranges from 0.1 to 15 mole %. Foams produced from more than 15 mole % of the silicone amine collapse resulting in foams of high density.

When the aliphatic amine is employed, it is generally used in an amount ranging from 1 to 40 percent based on the moles of acid ester employed.

In the preparation of the prepolymer, the tetracarboxylic acid derivative, usually in the form of the diester, is reacted with the diamines at a temperature below the reflux temperature of the reaction mixture. Without limiting the invention as to theory, it is believed that the prepolymer is formed of a low-molecular weight polyamide-acid/ester which can then be heated to complete the polymerization reaction. The prepolymer can thus be in the form of a liquid or a solid having a low-molecular weight, so long as it is capable of being converted by further reaction to a high-molecular weight polyimide polymer.

When using a lower alkyl ester of the tetracarboxylic acid, the resulting alcohol produced in the reaction as well as the water released during the reaction can be used as the blowing agent during polymerization to form the desired polyimide foams. Alternatively, use can be made of any of a variety of blowing agents, such as the solid blowing agents described in co-pending application Ser. No. 532,663, filed Sept. 16, 1983, the disclosure of which is incorporated herein by reference.

As there described, the homogeneity of the cellular structure of the resulting polyimide foam can be more accurately controlled by controlling the particle size of the solid blowing agent, when such a blowing agent is employed. It has been found that the particle size of the solid blowing agent is preferably less than 200 microns diameter, with 98% of the blowing agent particle sizes being less than 150 microns in diameter.

In the practice of the invention, it is possible to include in the reaction mixture various filler and/or reinforcing materials. For example, graphite, glass and other synthetic fiber can be added to the composition to produce a fiber-reinforced product. It is frequently desirable to employ a surfactant, thereby increasing bubble stability and the unformity of the cellular structure, to increase the fatigue resistance of the foam and to make the foam more flexible and resilient. Such surfactants are themselves conventional, and form no part of the present invention.

The temperatures at which the prepolymer is converted to the polyimde polymer are generally those temperatures used in the preparation of other polyimide polymers. As a general rule, temperatures ranging from 200° to 400° C can be used, with heating times ranging from 5 to 60 minutes or longer. As those skilled in the art will appreciate, the time of carrying out the reaction is somewhat dependent on the reaction temperature, higher temperatures enabling the use of shorter reaction times. It is also possible to heat to a lower temperature in the first stage of the reaction and then higher temperatures in the later stages.

Heating can be carried out in a conventional oven if desired. Alternatively, the foaming and curing of the prepolymer into a polyimide polymer can be effected by means of microwave heating. It has been found that the prepolymer can be converted to the corresponding polyimide foam by exposing the prepolymer for 1 to 120 minutes to radio frequencies within the range 915 to 2450 mHz, with the power output ranging from 1 to 100 kw. The power output to prepolymer weight ratio generally reads from about 0.1 to 10 kw per kg.

Having described the basic concepts of the invention, reference is now made to the following example which is provided by way of illustration, but not by way of limitation, of the practice of the invention.

EXAMPLE

This example illustrates the practice of the present invention in the use of the amine-terminated silicone. A reaction mixture is formulated of 3,3'4,4'-benzophenone tetracarboxylic acid dimethyl ester (BTDA), 2,6-diaminopyridine (DAP), p,p'-methylene dianiline (MDA) and an amine-terminated silicone (ATS) having the formula:

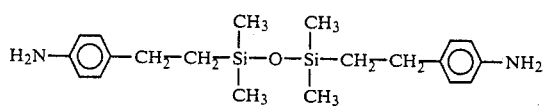

in molar % concentrations of 1.0, 5.0, 7.5, 10, 15 and 20 based on the number of moles of the BTDA. The molar proportions of each reaction mixture are shown below:

| SAMPLE | BTDA | DAP | MDA | ATS |
|--------|------|-------|-------|-------|
| A | 1.0 | 0.295 | 0.695 | 0.01 |
| B | 1.0 | 0.275 | 0.675 | 0.05 |
| C | 1.0 | 0.263 | 0.663 | 0.075 |
| D | 1.0 | 0.250 | 0.650 | 0.10 |
| E | 1.0 | 0.225 | 0.625 | 0.15 |
| F | 1.0 | 0.200 | 0.600 | 0.20 |

The resulting reaction mixtures are then heated to 60° for 180 minutes a solid prepolymer.

Thereafter, the polymer is heated at 300° C. to form a series of foam polyimides.

It will be understood that various changes and modifications can be made in the details of procedure, formulation and use without departing from the spirit of the invention, especially as defined in the following claims.

We claim:

1. A polyimide foam prepared by reaction of an organic tetracarboxylic acid ester with (a) 0.1 to 15 mole % of a diamine having the formula:

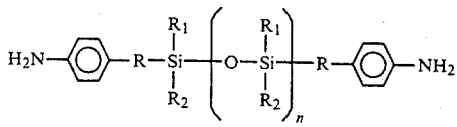

wherein R is a $C_2$ to $C_6$ alkylene group, $R_1$ and $R_2$ are each independently lower alkyl containing 1 to 3 carbon atoms and n is an integer from 1 to 4 and (b) at least one amine having the formula:

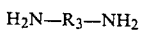

wherein $R_3$ is an aromatic group containing 5 to 16 carbon atoms.

2. A polyimide foam as defined in claim 1 wherein the tetracarboxylic acid derivative is a compound having the formula:

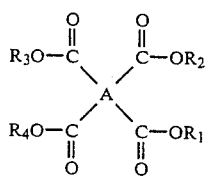

wherein A is a tetravalent organic group and $R_1$ to $R_4$ are each selected from the group consisting of hydrogen and lower alkyl.

3. A polyimide as defined in claim 1 which includes at least one heterocyclic diamine.

4. A polyimide foam as defined in claim 1 which includes at least one aliphatic diamine.

5. A polyimide as defined in claim 1 wherein $R_3$ contains up to one hetero atom in the ring, the hetero atom being selected from the group —N—, —O— and —S—.

6. A process for the preparation of a polyimide foam comprising reacting an organic tetracarboxylic acid ester with (a) 0.1 to 15 mole % of a diamine having the formula:

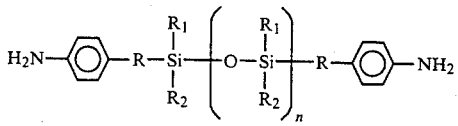

wherein R is a $C_2$ to $C_6$ alkylene group, $R_1$ and $R_2$ are each independently lower alkyl containing 1 to 3 carbon atoms and n is an integer from 1 to 4 and (b) at least one amine having the formula:

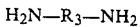

wherein $R_3$ is an aromatic group containing 5 to 16 carbon atoms, and heating the reaction mixture to polymerize and convert it to a foam.

7. A polyimide foam as defined in claim 1 wherein the tetracarboxylic acid ester is a di(lower alkyl) ester of benzophenone tetracarboxylic acid.

8. A process as defined in claim 6 wherein a blowing agent is used to form the foam.

* * * * *

UNITED STATES PATENT AND TRADEMARK OFFICE
CERTIFICATE OF CORRECTION

PATENT NO.  : 4,535,099
DATED       : August 13, 1985
INVENTOR(S) : Raymond Lee, David W. Okey and Gregory A. Ferro It is certified that error appears in the above-identified patent and that said Letters Patent is hereby corrected as shown below:

The Assignee of Patent No. 4,535,099 should read -- Imi-Tech Corporation --.

In Column 1, line 32, delete "tbe" and insert therefor -- the --.

In Column 1, line 34, delete "resistient" and insert therefor -- resilient --.

In Column 5, line 52, after "60°", insert -- C. --.

In Column 5, line 53, after "minutes", insert -- to produce --.

In Column 5, line 54, delete "polymer" and insert therefor -- prepolymer --.

Signed and Sealed this

Seventeenth Day of December 1985

[SEAL]

Attest:

DONALD J. QUIGG

Attesting Officer  Commissioner of Patents and Trademarks